July 16, 1968     M. RATICK     3,392,578
PORTABLE FLUID FLOW TEST CHAMBER
Filed Feb. 28, 1966

Inventor
MARTIN RATICK 3,392,578
PORTABLE FLUID FLOW TEST CHAMBER
Martin Ratick, 9201 New Hampshire Ave.,
Silver Spring, Md. 20903
Filed Feb. 28, 1966, Ser. No. 532,543
4 Claims. (Cl. 73—147)

ABSTRACT OF THE DISCLOSURE

A portable unit of fluid flow test apparatus in which a base bracket has opposed relatively adjustable clamping legs each having a rubber pad for adjustable attachment to a support of a transportation vehicle. A support boom interconnects the bracket with model mounting means within an open end housing having an upstream honeycomb fluid smoothing plate and venturi speed indicator adjacent thereto. Appropriate signal transmitting media extends from the indicator through the boom to recording instrument means mounted on the bracket.

The invention described herein may be manufactured and used by or for the Government for governmental purposes without the payment to me of any royalty thereon.

The invention relates to a portable fluid flow test chamber and more particularly to a portable fluid flow test chamber which can be removably attached to any type of transportation vehicle and which can be moved through a fluid test medium, at speeds limited only by the vehicle, while a test model, removably attached to a quill and instrumented base piece, is subjected to fluid flow.

During the development of aircraft, airborne munitions, parachutes, boats, hydraulic devices, and other products which are subjected to fluid flow, it is of immeasurable value to the development engineer to have an inexpensive method of readily obtaining raw data concerning how the product will react when subjected to fluid flow environment.

In the past, the most common method of obtaining data was to place a model in a wind tunnel or a water flow channel. Unfortunately there is usually a long waiting period before a wind tunnel or flow channel will be available and this delay can hamper the timely development of much needed products.

In addition, wind tunnel and flow channel time are very expensive and in many cases an engineer must forego the testing of the product at intermediate stages of development to save the waiting time and the expense of using same. The results of this delay are very often disasterous, for the product could be carried far down the development path before it has had its first tests, thereby necessitating costly redesign.

In contrast, if a series of preliminary tests could have been conducted, early in the development of the program, the anomalies would have been detected early enough to be corrected during the normal program progression.

It is therefore an object of the present invention to provide a portable fluid flow test chamber whereby models can be quickly and inexpensively tested.

Another object is the provision of a portable fluid flow test chamber that can be attached to any mode of transportation.

A further object is to provide a portable fluid flow test chamber that can be manufactured at a low cost and still yield reliable data.

Figure 1:
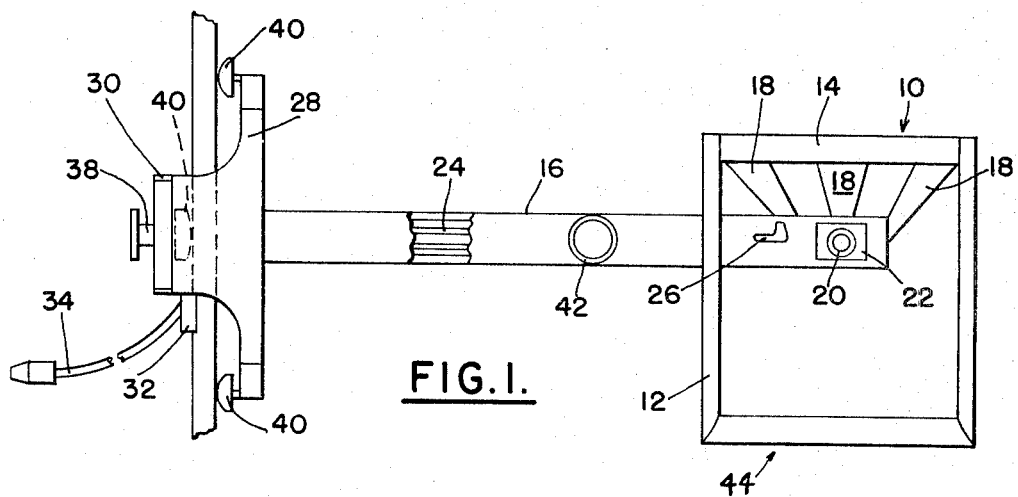
Figure 2:
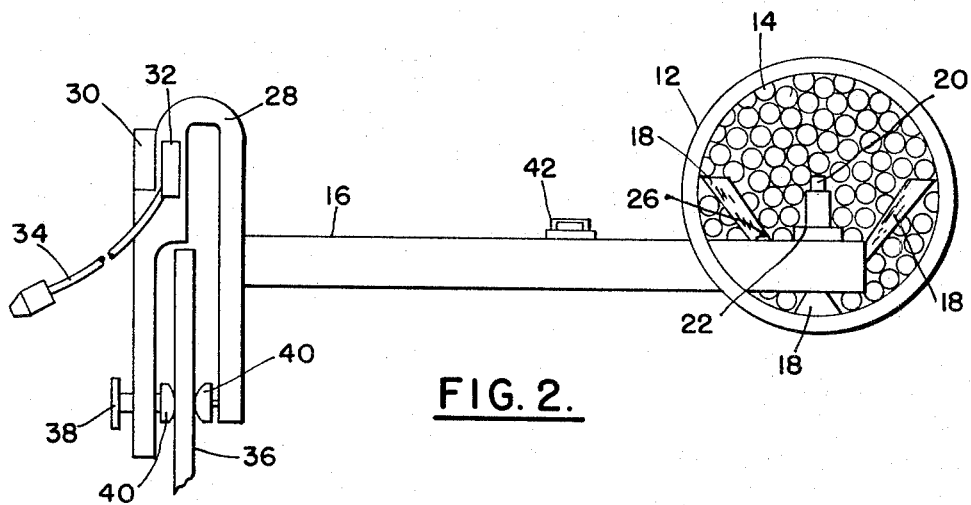

The above objects as well as others together with the benefits and advantages of the invention will be apparent upon reference to the detailed description set forth below, particularly when taken in conjunction with the drawings annexed hereto in which:

FIG. 1 illustrates a top view of the present invention;
FIG. 2 illustrates a rear plan view of the present invention.

The portable fluid flow test chamber 10 consists of a transparent housing 12 having a honeycomb air smoothing plate 14 facing upstream. The plate 14 is attached to a boom 16 by a plurality of brackets 18. The function of the honeycomb plate 14 is to change the initial turbulent fluid flow to relatively smooth flow through the throat of the transparent housing 12.

A model supporting mechanism consisting of a quill 20 for supporting the model to be tested and a base piece 22, as well as an adjacently positioned venturi speed indicator 26, are mounted on the boom one end within the housing fluid flow chamber.

A wire harness 24 and the necessary tubing, not shown, extend through the boom from the venturi speed indicator 26 and an associated transducer (not shown) adjacent the quill to a U-shaped clamping bracket 28 and into a shock mounted set of visual and recording instruments 32 mounted on the bracket 28. The wire harness 24 and the tubing are used for transmitting signals or impulses from the quill 20 and indicator 26 to the recording instrumentation 32 which is connectable by electric lead 34 having a free end suitable for connection to an electric power source (not shown) on the vehicle which has a support surface 36.

The fluid flow test chamber 10 is designed to fit through the window opening of an automobile, truck or aircraft, or on the gunwale of a boat whereupon battery power pack 30 mounted on bracket 28 may be utilized, and is removably clamped on the adjacent vehicle surface 36 by the clamping bracket 28 and its clamp handle 38 which is threadedly or adjustably connected thereto and carries at its inner end one of a pair of opposing clamping rubber pads 40, 40.

A camera mount 42 is attached to the boom 16 to hold a camera (not shown) to photograph the phenomena during exposure to fluid flow. In practice, an operator mounts the device on the vehicle to be used and fastens it with clamp handle 38. He then mounts the test model (not shown) on the quill 20 of the model supporting mechanism, mounts the camera (not shown) on the boom 16 if desired, and energizes the instrument panel. Following this procedure, the operator can then drive the vehicle at any speed he desires, causing air or any other fluid media to flow through the honeycomb plate 14, over the model (not shown) and out through the exit at the open end 44 of the transparent housing 12. The instruments will indicate and record the velocity of the fluid stream in the throat by means of the venturi meter 26 and, with the suitably employed transducer, will indicate and record the lift, drag, yaw, pitch and any other dynamic characteristics that are desired to be tested.

The advantages of the invention are as follows:

(1) Fluid flow is achieved by moving the test chamber through the fluid medium rather than by moving the fluid medium through the test chamber.

(2) This test chamber can be removably attached to any transportation vehicle and readily moved about.

(3) A minimum of power is required to operate this chamber. Electricity to operate the instruments is obtained from small batteries or the vehicle power source, like a cigarette lighter socket in a car. The regular motive power used to drive the vehicle is used, without sacrifice of said motive power, to move the chamber through the test fluid medium.

(4) Models can be designed to break away in the test chamber (test to failure). In conventional wind tunnels, for example, a great deal of damage can be done to the tunnel if a model breaks apart during test.

(5) The cost of a test chamber as herein described is low in cost as compared to the cost of the conventional test chambers.

Therefore, while a particular embodiment of the subject invention has been shown and described herein, it is in the nature of description rather than limitation, and it will occur to those skilled in the art that various changes, modifications, and combinations may be made within the province of the appended claims and without departing either in spirit or scope from this invention in its broader aspects.

I claim:

1. A portable unit of fluid flow test apparatus for adjustable attachment to a transportation vehicle support surface, comprising:

a bracket having relatively adjustable clamping legs for removable attachment to said support surface, said legs each having at least one of a pair of opposing rubber pads, recording instrument means mounted on said bracket, an open end housing having an upstream honeycomb fluid smoothing plate, model mounting means in said housing adjacent said plate, a venturi speed indicator adjacent said model mounting means, a support boom interconnecting said bracket and model mounting means, and means extending through said boom for transmitting signals from said model mounting means and indicator to said recording instrument means.

2. The arrangement of claim 1 wherein said housing is of transparent material and said boom has camera mounting means thereon adjacent said transparent housing.

3. The structure of claim 2 in which a battery power pack is mounted on said bracket.

4. The structure in accordance with claim 2 wherein an electric lead has one end thereof connected with said recording instrument means and another end suitable for connection to a power source on said vehicle.

References Cited

UNITED STATES PATENTS

| | | | |
|---|---|---|---|
| 1,498,023 | 6/1924 | Fales | 73—147 |
| 1,635,040 | 7/1927 | Fales | 73—213 XR |
| 3,055,212 | 8/1962 | Mackey | 73—147 |

DAVID SCHONBERG, *Primary Examiner.*